United States Patent [19]
Bonikowski

[11] 3,892,043
[45] July 1, 1975

[54] OBSERVATION METHOD AND EQUIPMENT

[75] Inventor: Zbigniew Bonikowski, London, England

[73] Assignee: British Insulated Callender's Cables Limited, London, England

[22] Filed: Dec. 4, 1973

[21] Appl. No.: 421,737

[30] Foreign Application Priority Data
Dec. 7, 1972 United Kingdom............ 56427/72

[52] U.S. Cl............. 33/143 L; 33/143 L; 33/147 L; 33/147 N; 33/149 J; 33/178 E; 33/DIG. 5; 264/40
[51] Int. Cl......................... G01c 7/04; G01c 7/12
[58] Field of Search......... 33/143 L, 147 L, 147 N, 33/149 J, 174 L, 174 Q, 178 E, 125 T, DIG. 5, 172 E; 425/141; 264/40

[56] References Cited
UNITED STATES PATENTS

| | | | |
|---|---|---|---|
| 1,745,878 | 2/1930 | Trumpler | 33/172 E |
| 2,519,221 | 8/1950 | Bogen et al. | 33/178 E |
| 2,566,854 | 9/1951 | Rhodes | 264/40 |
| 2,568,587 | 9/1951 | MacGeorge | 33/DIG. 5 |
| 2,657,350 | 10/1953 | Rossire | 33/DIG. 5 |
| 3,007,252 | 11/1961 | Munn | 33/178 E |
| 3,103,072 | 9/1963 | Golley et al. | 33/143 L |

Primary Examiner—Richard E. Aegerter
Assistant Examiner—Richard R. Stearns
Attorney, Agent, or Firm—Buell, Blenko & Ziesenheim

[57] ABSTRACT

A method of observing a diameter of an extruded body, for example a rubber body within the curing chamber of continuous vulcanising plant, entails biassing at least two feelers into contact with spaced regions of the surface of the body. Electrical signals representing the positions of the feelers are obtained and are combined to give the required diameter. If two diametrically opposed feelers are used and the signals vary linearly with displacement of the feelers from the appropriate datum, the difference of the signals is the required output. The sum of the signals is also useful since it represents the position of the product. To facilitate observation of a feeler's position when it is within a curing chamber or other enclosure, it preferably includes, or is coupled within the enclosure to, a ferromagnetic armature, and the position of the armature is observed electromagnetically from outside the enclosure.

17 Claims, 6 Drawing Figures

OBSERVATION METHOD AND EQUIPMENT

This invention relates to a method of and equipment for making observations on extruded bodies and is especially applicable to the observation of rubber bodies that are being cured in a continuous process by the application of heat and pressure as they are formed, the term "rubber" as used herein where the context admits including all polymers (whether highly elastic or not) that can be so cured (vulcanised or cross-linked).

Curing is a relatively slow process, and even under the most extreme feasible curing conditions it may require many minutes (even as much as an hour in the case of some large cable cores) for curing to be complete so that the product may emerge from the pressure chamber for inspection, and a correspondingly long length of the product may have to be scrapped if it proves to be defective when it does emerge. It is therefore very desirable to observe the important properties of the product, and especially its cross-sectional dimensions, within the pressure chamber (and as close as possible to the extrusion die).

Optical observation has been attempted, but is unreliable owing to the difficulties of keeping the observation window clean and sufficiently free of condensation to permit observation and the product free of condensation droplets that would confuse the observation.

In accordance with one aspect of the invention, a method of observing a diameter of an extruded product comprises contacting at least two spaced surface regions of the product with a corresponding number of feelers, obtaining electrical signals representing the displacement from a datum position of each feeler in a direction perpendicular to the product axis, and combining these signals to derive an output signal representing a diameter of the product.

Preferably a diametrically opposed pair of feelers (or more than one such pair) is used since this arrangement enables a specific diameter to be calculated without using any assumption regarding the shape of the product, whereas if for example three feelers at 120° are used it is only possible to compute the diameter of the product if it is circular or of some other specific shape and orientation.

Especially when paired feelers are used, the displacement signals preferably vary linearly with the relevant movement at least over the working range of displacements. Preferably the datum positions are those in which the respective feelers touch the desired position of the product axis; in a paired-feeler system when both these conditions are satisfied, the output signal required is simply the difference between the two signals (or any unique function of the difference could be used). From the signals representing the feeler positions may also be derived a further output signal which indicates the position of the product axis and which in a "catenary" curing system (in which the curing chamber is shaped to follow the natural curve of the product, which is supported only at the extruder and the chamber outlet) is indicative of, and can be used to regulate, the tension in the product. In the linear-response paired-lever system with the datum positions defined this furter signal is the sum of the position signals of the two feelers (or a unique function thereof).

The electrical signals are preferably amplitudes of current or voltage, but they might be frequencies or phases.

The invention includes apparatus for use in carrying out the method described.

It would be possible to detect the position of a feeler and obtain the corresponding electrical signal by an appropriate type of transducer located wholly within a curing chamber or other enclosure, but this is difficult because the temperature of a curing chamber (typically 220°C) will usually be higher than the present maximum continuous service temperature for organic insulating materials (nominally 180°C). Another possibility is to transmit the motion of the feeler through a rotary seal or a sliding seal in the wall of the chamber to a transducer outside the chamber, but the use of a high pressure seal (tight against a pressure of the order of 2MN/m$^2$ (300 psi)) limits sensitivity and creates maintenance problems.

Another aspect of the invention provides a method and a sensing device that overcomes these difficulties and is especially suitable for use in the method hereinbefore described, although it can also be used with advantage in position detection for tension control purposes.

In accordance with this aspect of the invention, a method of sensing the position of a surface of an extruded product passing through an enclosure as it is being formed comprises biassing into contact with the surface a feeler comprising, or coupled within the enclosure to, a ferromagnetic element and detecting the position of the ferromagnetic element by electromagnetic detecting means outside the enclosure. When the enclosure is heated, as curing chambers normally will be, the detecting means will be thermally insulated from the curing chamber. This aspect of the invention includes apparatus accordingly.

The feeler may move on a fixed pivot, but the movement of the ferromagnetic element is preferably rectilinear and preferably perpendicular to the axis of the rubber product. Preferably the ferromagnetic element moves in a sleeve of a suitable (non-screening) material, such as stainless steel, projecting from the main curing chamber. This sleeve is enclosed in thermally insulating material.

To maximise the temperature drop across the insulating material, and so to minimize its thickness and maximize sensitivity, it is preferably in its turn surrounded by a heat sink designed to avoid screening. A sleeve of aluminium or other metal of high thermal conductivity, longitudinally slit in at least one place to avoid screening and bearing fins at the end remote from the main curing chamber forms a suitable heat sink onto which detecting coils insulated with high temperature organic enamels (e.g. polyamide-imide or polyimide) can be directly wound.

Preferably two axially spaced coils are used to form a differential transformer which can be operated by conventional electronic circuitry.

The invention will be further illustrated, by way of example, with reference to the accompanying drawings which show apparatus which provides signals indicative of both the position and the diameter of an electric cable core within a chamber for continuous vulcanisation of a rubber layer extruded thereon. In the drawings.

Figure 1:
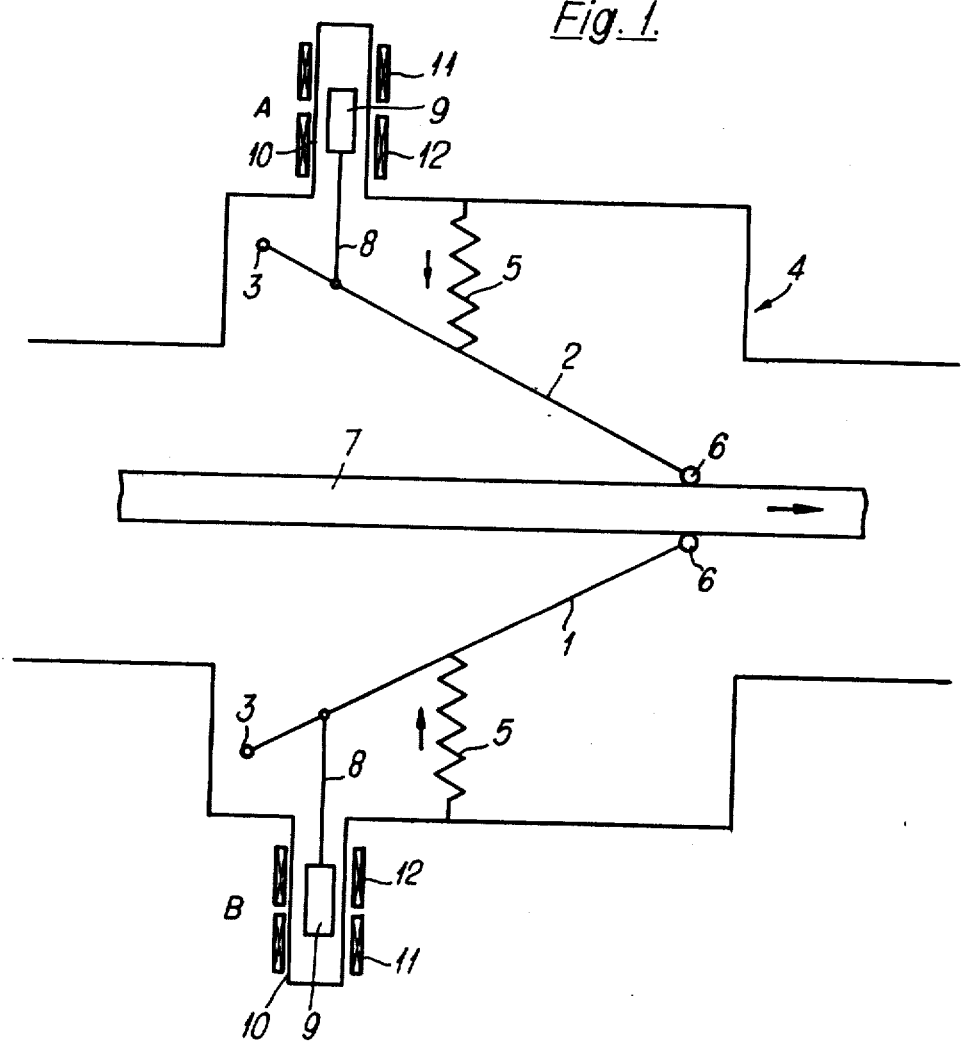
FIG. 1 is a diagram of the apparatus illustrating the principle of its operation.

The apparatus comprises a pair of levers 1, 2, mounted on fixed pivots 3 within the vulcanising chamber. Biassing forces, represented diagrammatically as compression springs 5, urge the free ends 6 into contact with the cable core 7 as it advances through the apparatus. Each of the levers 1, 2 has pivotted on it a slider 8 bearing a ferromagnetic armature 9.

Each of these armatures moves in response to movement of its lever inside a sleeve 10 of non-screening material that forms a part of the wall of the vulcanising chamber. Around the exterior of this sleeve is mounted a primary coil 11 and a secondary coil 12 together constituting a differential transformer.

Figure 2:
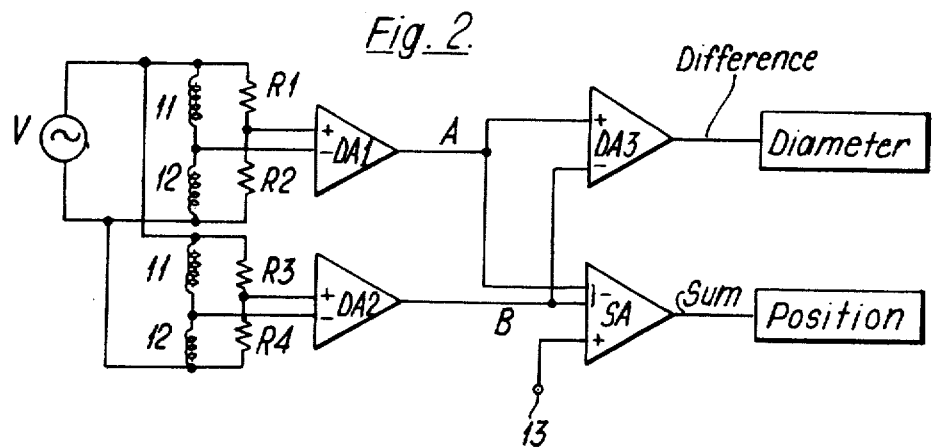
FIG. 2 is an outline circuit diagram.

As shown in FIG. 2, each pair of coils 11, 12 is connected in series and connected to a fixed alternating voltage source (an oscillator) V. Across each series pair is connected a pair of equal resistors R1, R2 and R3, R4 respectively. A first differential amplifier DA1 takes its input across the junction of the first pair of coils 11, 12 and the junction of the resistors R1 and R2 and produces an output signal A representing the difference in impedence of those coils 11, 12 and hence the position of the ferromagnetic armature. Simultaneously a second differential amplifier DA2 produces an output signal B representing the position of the other ferromagnetic armature. Component values and the dimensions of the apparatus are chosen (using standard procedures) so that, within the working range of movements, the signals A and B vary linearly with the positions of the respective armatures and are each zero when the corresponding feeler touches the intended product axis. The signals A and B are combined, using a further differential amplifier DA3 to obtain A – B and using a summing amplifier SA to obtain A + B; the sum is displayed as a position signal and the difference as a diameter signal (or vice versa if the alternative sign convention is used). The signals may also be utilised as inputs to automatic control equipment regulating the tension in the cable core and the relative speeds of the extruder and the take-up to maintain the required operating conditions in the conventional way.

Figure 3:
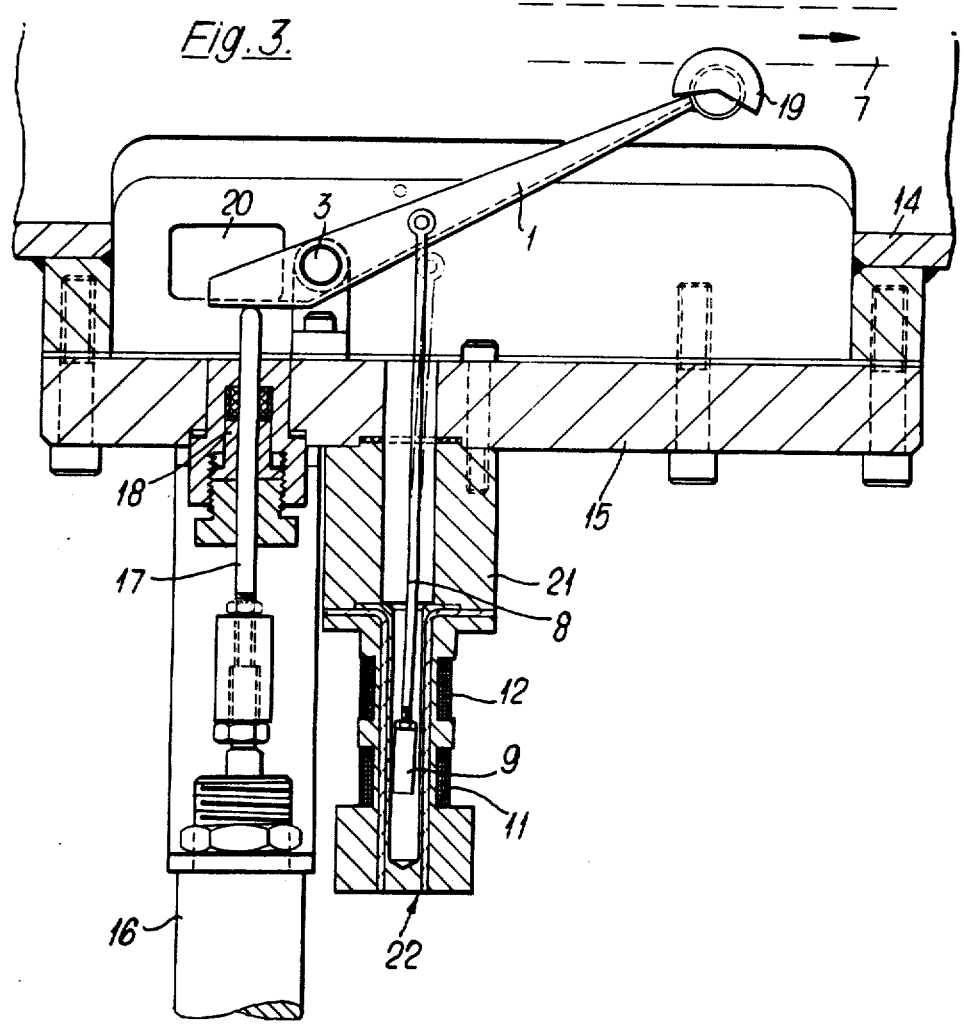
FIG. 3 is a half-section showing the mechanical aspects of the apparatus.
Figure 4:
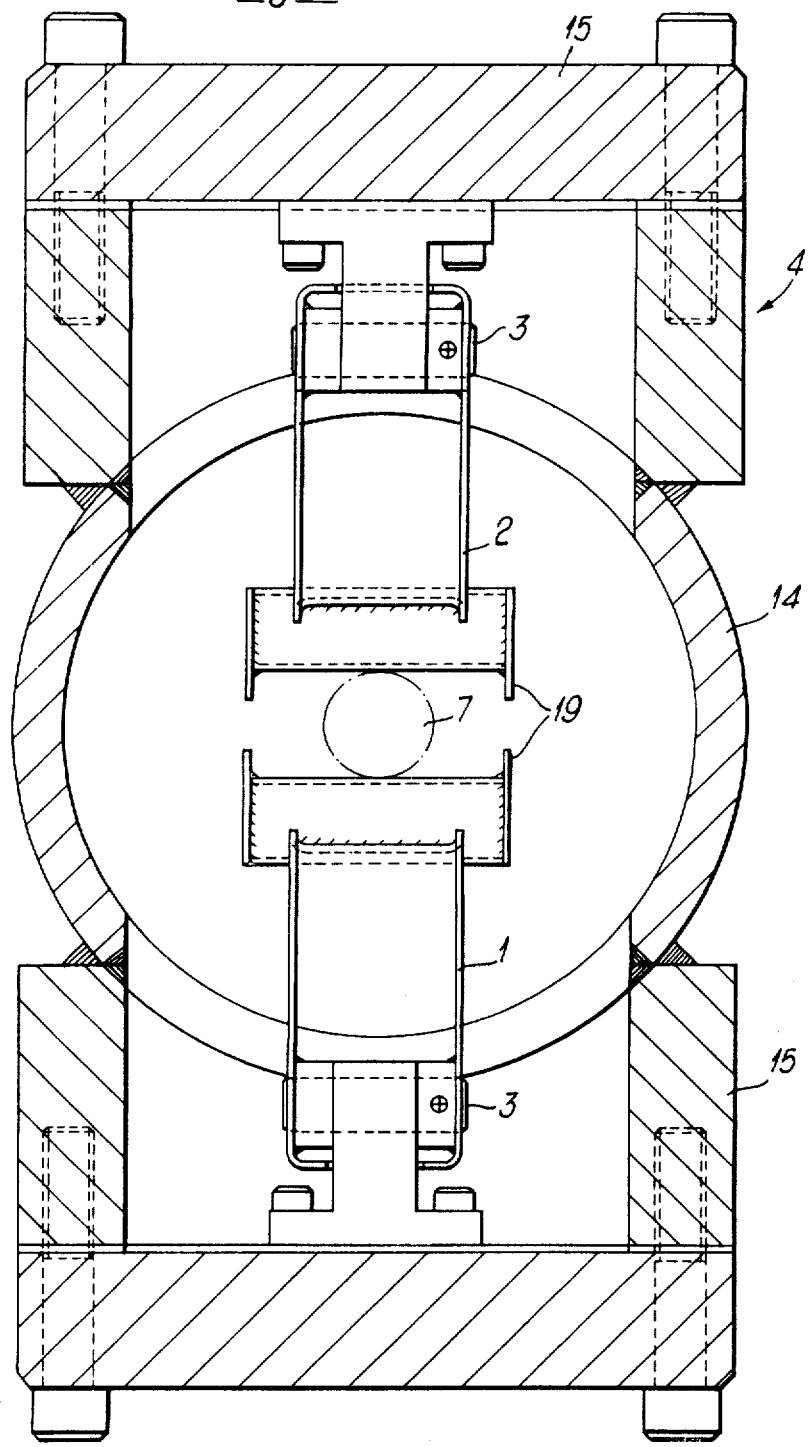
FIG. 4 is an end-view of the apparatus.

Referring now to FIGS. 3 and 4, it will be seen that the vulcanising chamber comprises a main tubular section 14 through which the cable core 7 passes and two recesses 15 therein within which the levers 1, 2 and associated parts are mounted. A small pneumatic motor 16 operates a pushrod 17 passing through a sliding seal 18 in the chamber wall to engage the lever 1 and withdraw it into its recess 15 when required, as for threading up the apparatus.

The free end of the lever 6 is formed by a shoe 19 for engagement with the cable core, and the biassing force for the lever is generated by a counterweight 20. The slider 8 supporting the armature 9 operates in a tubular extension 21 of the vulcanising chamber which leads to a thermally insulated sleeve 22 bearing the coils 11 and 12, as more fully described below. The upper part of the apparatus, not shown in FIG. 3, is identical except that the counterweight 20 is in this case omitted since the weight of the lever 2 (together with its shoe 19, slider 8 and armature 9) provides a biassing force of the correct sense and sufficient magnitude.

Figure 5:
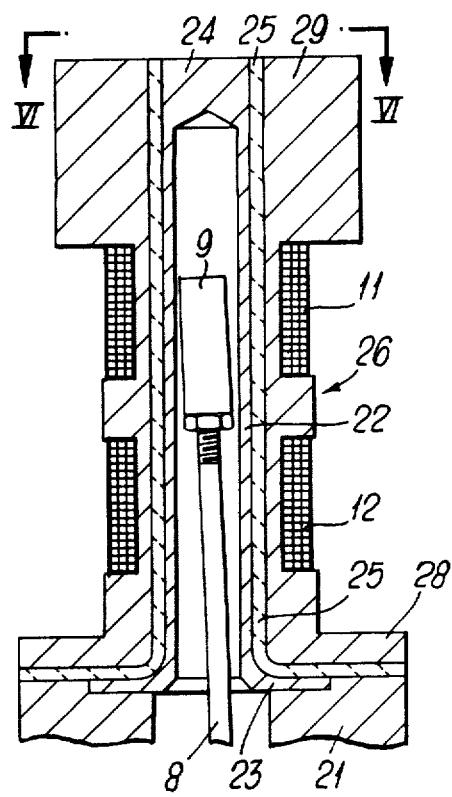
FIG. 5 is an enlarged view of a part of the apparatus.
Figure 6:
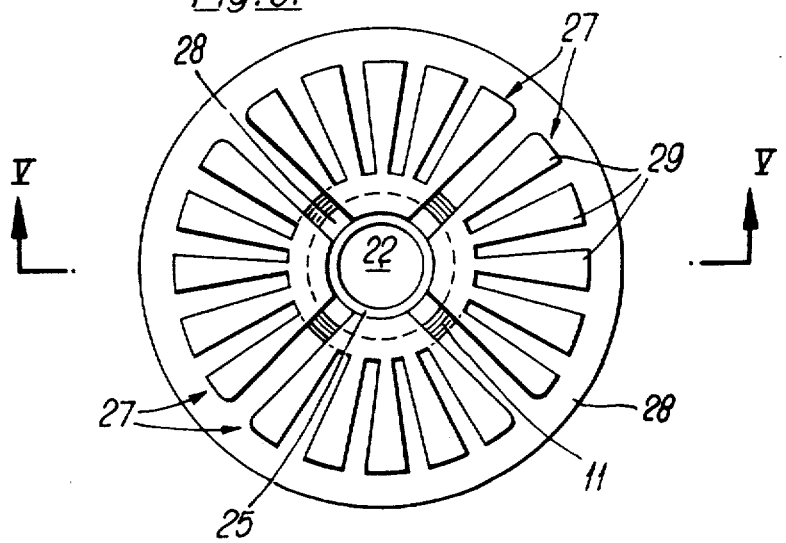
FIG. 6 is a plan view of the part of the apparatus shown in FIG. 5.

As seen in FIGS. 5 and 6, the sleeve 22, which is of stainless steel, is connected to the tubular extension 21 by a flange 23 and has an integral closure 24 at its opposite end. It is thermally insulated by a sleeve 25 made of asbestos or other efficient thermally insulating material in turn surrounded by a heat sink 26 made up of four aluminium quadrants 27 circumferentially spaced from one another but connected by an integral annular flange 28. Each quadrant bears cooling fins 29 at its free end. The windings 11 and 12, formed from Class E enamelled wire, are wound directly onto recesses formed in the surface of the heat sink.

What I claim as my invention is:

1. A method of sensing the position of a surface of an extruded product passing through an enclosure as it is being formed comprising biassing into contact with the surface a feeler which is connected to and moves a ferromagnetic element located within the enclosure and detecting the position of said ferromagnetic element by electromagnetic detecting means located outside the enclosure.

2. A method as claimed in claim 1 wherein said extruded product is an extruded rubber product and said enclosure is a curing chamber in which said extruded product is being cured in a continuous process by the application of heat and pressure as it is being formed.

3. A method as claimed in claim 1 in which said feeler moves pivotably about a fixed axis.

4. A method as claimed in claim 3 in which said ferromagnetic element moves substantially rectilinearly.

5. A method as claimed in claim 3 in which said ferromagnetic element moves substantially perpendicularly to the axis of the said product.

6. A method as claimed in claim 1 further comprising constraining said ferromagnetic element to move within a sleeve of magnetically non-screening material projecting from the said enclosure and thermally insulating said electromagnetic detecting means from said sleeve.

7. A method of sensing the position of a surface of an extruded rubber product as it is being cured in a continuous process by the application of heat and pressure in a main curing chamber as it is being formed comprising biassing into contact with the surface a feeler which is connected to and moves a ferromagnetic element that is located within the curing chamber and is constrained to move within a sleeve of magnetically non-screening material projecting from the main curing chamber and detecting the position of the ferromagnetic element by electromagnetic detecting means including coils wound on a heat sink surrounding the said sleeve but spaced from it by a layer of thermally insulating material.

8. A method as claimed in claim 7 in which the heat sink is made of metal of high thermal conductivity and bears fins at its end remote from the main curing chamber and in which magnetic screening is avoided by longitudinally slitting the heat sink parallel to the axis of said heat sink in at least one place.

9. A method as claimed in claim 7 in which the coils said ferromagnetic element form a differential transformer.

10. Measuring apparatus suitable for sensing the position of a surface of an extruded product passing through an enclosure as it is being formed comprising a feeler which is connected to means for moving a ferromagnetic element located within the enclosure in response to movements of said feeler, means for biassing said feeler into contact with said surface and electromagnetic detecting means located outside the enclosure for detecting the position of said ferromagnetic element.

11. Measuring apparatus in accordance with claim 10 wherein said apparatus senses the position of a surface of an extruded rubber product as it is being cured in a continuous process by the application of heat and pressure in a curing chamber as it is being formed and in which said electromagnetic detecting means includes means for thermally insulating said detecting means from the curing chamber.

12. Measuring apparatus as claimed in claim 11 in which the means for moving moves the ferromagnetic element along a substantially rectilinear path.

13. Measuring apparatus as claimed in claim 12 in which the means for moving moves the ferromegnetic element along a path substantially perpendicular to the axis of the rubber product.

14. Measuring apparatus for sensing the position of a surface of an extruded rubber product as it is being cured in a continuous process by the application of heat and pressure in a main curing chamber as it is being formed comprising a feeler which is connected to means for moving a ferromagnetic element that is constrained to move within a sleeve of magnetically non-screening material projecting from the main curing chamber in response to movements of said feeler, means for biassing the feeler into contact with the surface, electromagnetic detecting means located outside the said sleeve for detecting the position of the ferromagnetic element and means thermally insulating said detecting means from said sleeve.

15. Measuring apparatus for sensing the position of a surface of an extruded rubber product as it is being cured by the application of heat and pressure while passing continuously through a main curing chamber as it is being formed comprising: a sleeve of magnetically non-screening material projecting from the main curing chamber; a feeler which is connected to means for moving a ferromagnetic element that is located always within the said sleeve in response to movements of said feeler; means for biassing the feeler into contact with the surface of the product; a magnetically nonscreening heat sink surrounding the said sleeve but spaced from it by a layer of thermally insulating material; and electromagnetic detecting means, including coils wound on the heat sink, for detecting the position of the ferromagnetic element.

16. Measuring apparatus as claimed in claim 15 in which the heat sink is made of metal of high thermal conductivity and includes fins at its end remote from the main curing chamber and in which the heat sink is longitudinally slit parallel to the axis of said heat sink in at least one place, to avoid magnetic screening.

17. Apparatus as claimed in claim 15 in which the said coils and said magnetic element form a differential transformer.

* * * * *